O. W. Ludlow,
Water Wheel.

N°. 67,994.  Patented Aug. 20 1867.

Witnesses:
Theo Tusche
Wm Trewin

Inventor:
O. W. Ludlow
Per Munn & Co
Attorneys

United States Patent Office.

O. W. LUDLOW, OF DAYTON, OHIO.

*Letters Patent No. 67,994, dated August 20, 1867.*

IMPROVEMENT IN WATER-WHEELS.

*The Schedule referred to in these Letters Patent and making part of the same.*

TO ALL WHOM IT MAY CONCERN:

Be it known that I, O. W. LUDLOW, of Dayton, in the county of Montgomery, and State of Ohio, have invented a new and improved Water-Wheel; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and useful improvement in horizontal water-wheels, and has for its object the varying of the discharge of the water from the wheel by varying the capacity of the issues, and also by regulating the action or suction of the draught-wheel, whereby the capacity of the wheel may be regulated to suit the amount of power it is required to give out, and the wheel made to work at a less power than its maximum, with the use of a proportionate amount of water only. In the accompanying sheet of drawings—

Figure 1:
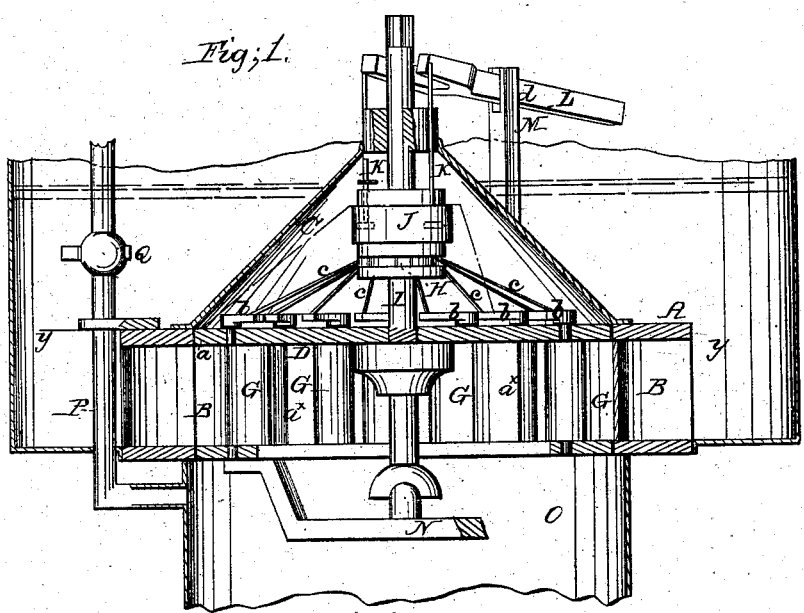
Figure 2:
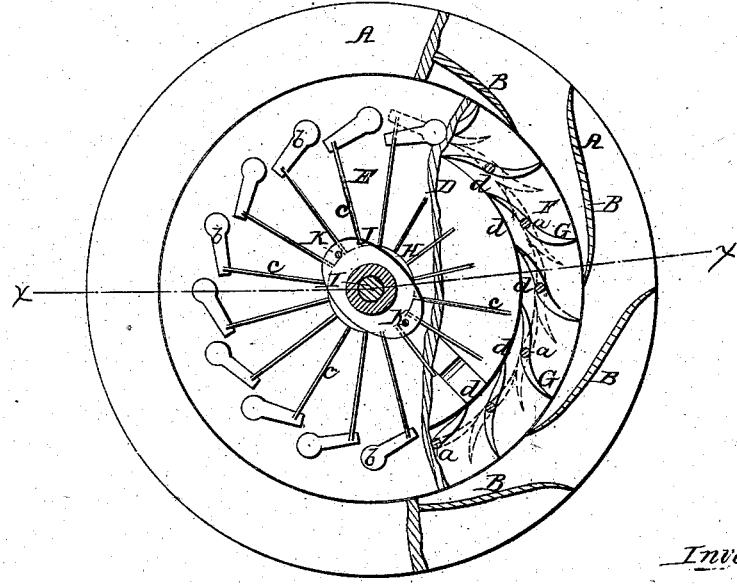

Figure 1 is a vertical section of my invention, taken in the line $x\ x$, fig. 2.

Figure 2, a horizontal section of the same, taken in the line $y\ y$.

Similar letters of reference indicate like parts.

A A represent two rims or annular plates, placed one above the other, and having chutes B placed between them to guide or direct the water properly against the buckets of the wheel. C represents a cone, attached to the upper rim A to serve as a cover, and D represents the wheel, composed of a solid circular top plate, E, and a bottom rim, F, connected by vertical bolts or uprights $a^\times$, the buckets G of the wheel being between E and F and fitted on central pivots or rods $a$. The buckets G are slightly curved in serpentine form, as shown clearly in fig. 2, and their pivots or rods $a$ extend up through the top plate E of the wheel, and have arms $b$ attached to them, one to each, as shown clearly in fig. 2. The outer ends of the arms $b$ are connected by rods $c$ to the lower end of a collar, H, which is placed loosely on the shaft I, and allowed to slide freely up and down thereon. This collar H has a yoke, J, fitted upon it, and this yoke has two rods, K K, attached to it, which pass up through the upper part of the cone and are attached to a lever, L, the fulcrum $d$ of which is in the upper end of an upright, M, on the cone.

From the above description it will be seen that by adjusting the lever L the collar H will be raised and lowered on the wheel-shaft I, and the buckets G turned or adjusted so that the issues $d$ between the buckets may be enlarged or diminished as required.

The lower end of the wheel-shaft I is stepped in a bridge-tree, N, the ends of which are attached to the lower rim A. The wheel, in practice, is placed half way between the head and tail water, and a suction or draught-tube, O, is attached to the lower rim A. Hence, with twenty feet head and fall, there will be ten feet of head above the wheel and ten feet of suction of draught-tube below. To the suction or draught-tube is attached a ventilating pipe, P, which extends up above the surface of the water. This pipe P has a valve, Q, inserted in it, which is turned or operated by a governor or otherwise, so as to give more or less vent to the tube P and control the suction or draught in tube O, as may be desired.

By these two means—to wit, the regulating of the capacity of the issues between the buckets, and the regulating of the suction or draught within the tube O—the wheel may be run at a less power than its maximum, and with an expenditure of water commensurate with the power given out by the wheel.

The great objection to horizontal water-wheels hitherto has been the loss of water whenever a wheel is run at less than its maximum power, more water being consumed in proportion than when the wheel is run at its maximum. This difficulty is believed to be fully obviated by my invention.

Having thus described my invention, I claim as new, and desire to secure by Letters Patent—

1. The construction and arrangement of the arms $b$, attached to the pivoted rods $a$ of the buckets G, their inner ends connected by the rods C to the sliding collar H, operated by means of the rods K and lever L, as herein set forth, for the purpose specified.

2. The vent-tube or ventilating pipe P, applied to the draught-tube O and, provided with a valve, substantially as and for the purpose set forth.

O. W. LUDLOW

Witnesses.
A. PAULLUS,
J. H. BAGGOTT.